United States Patent [19]

Voegtlin

[11] Patent Number: 5,109,758
[45] Date of Patent: May 5, 1992

[54] BAKERY OVEN WITH CONTINUOUS BAKING PROCESS

[76] Inventor: René Voegtlin, 2, rue de la Colline, Oberhausbergen, 67200 Strasbourg, France

[21] Appl. No.: 592,990

[22] Filed: Oct. 4, 1990

[30] Foreign Application Priority Data

Oct. 9, 1989 [FR] France .................. 89 13316

[51] Int. Cl.$^5$ .................. A21B 1/46; A21D 8/00
[52] U.S. Cl. .................. 99/443 C; 99/386; 99/479; 99/427
[58] Field of Search .................. 99/360, 365, 367, 371, 99/386, 423, 427, 443 C, 443 R, 478, 479; 198/465.1, 778, 724; 134/132

[56] References Cited

U.S. PATENT DOCUMENTS

| | | | |
|---|---|---|---|
| 1,085,852 | 2/1914 | Duncan | 198/778 |
| 1,177,502 | 3/1916 | Ewald | 99/365 |
| 1,193,632 | 8/1916 | Thompson | 99/365 |
| 2,093,270 | 9/1937 | Glinka | 198/778 |
| 2,930,310 | 3/1960 | Poppenburg | 99/479 |
| 3,240,316 | 3/1966 | Huffman | 198/778 |
| 3,494,305 | 2/1970 | Pachyn | 99/427 |
| 4,079,666 | 3/1978 | Plemons | 99/386 |
| 4,514,167 | 4/1985 | Royer | 99/443 C |
| 4,882,981 | 11/1989 | Bacigalupe | 99/479 |

FOREIGN PATENT DOCUMENTS

| | | |
|---|---|---|
| 1928652 | 1/1971 | Fed. Rep. of Germany . |
| 2345925 | 10/1977 | France . |
| 2428977 | 1/1980 | France . |
| 30760 | 4/1933 | Netherlands .................. 99/423 |

Primary Examiner—Philip R. Coe
Assistant Examiner—Terrence R. Till
Attorney, Agent, or Firm—Sandler, Greenblum & Bernstein

[57] ABSTRACT

Bakery oven for a continuous baking process which includes a baking chamber provided with a charging opening and a discharging opening, and containing a spiral conveying device provided with a helicoidal path for conveying the bakery products arranged on trays, plates, racks or the like from the charging opening to the discharging opening. This bakery oven is provided with frames ensuring the individual picking-up of the plates, trays, racks or the like outside the baking chamber to convey them by means of the spiral conveying device, and the spiral conveying device includes a mechanism for individually conveying and guiding the frames along the helicoidal path.

29 Claims, 3 Drawing Sheets

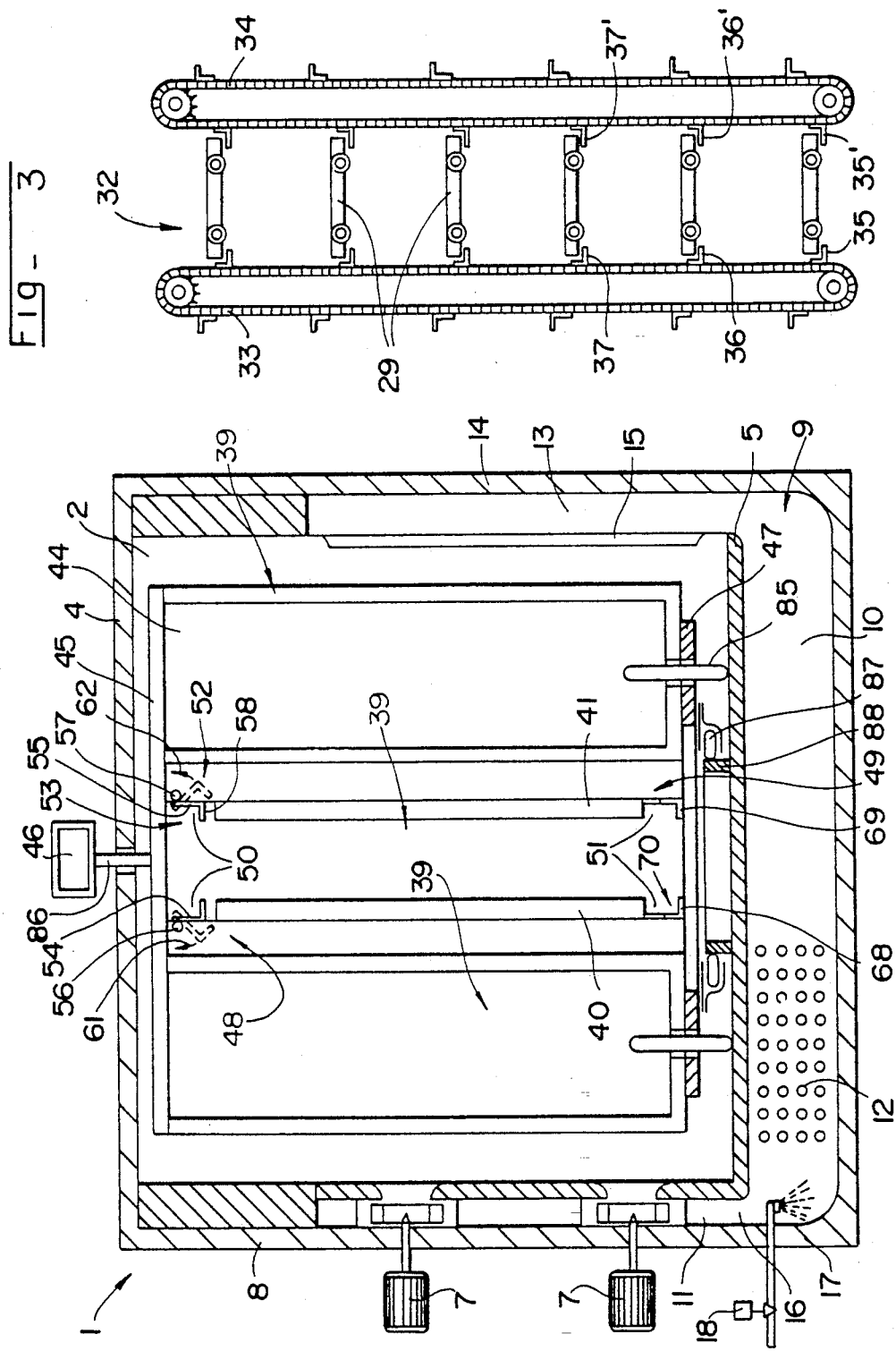

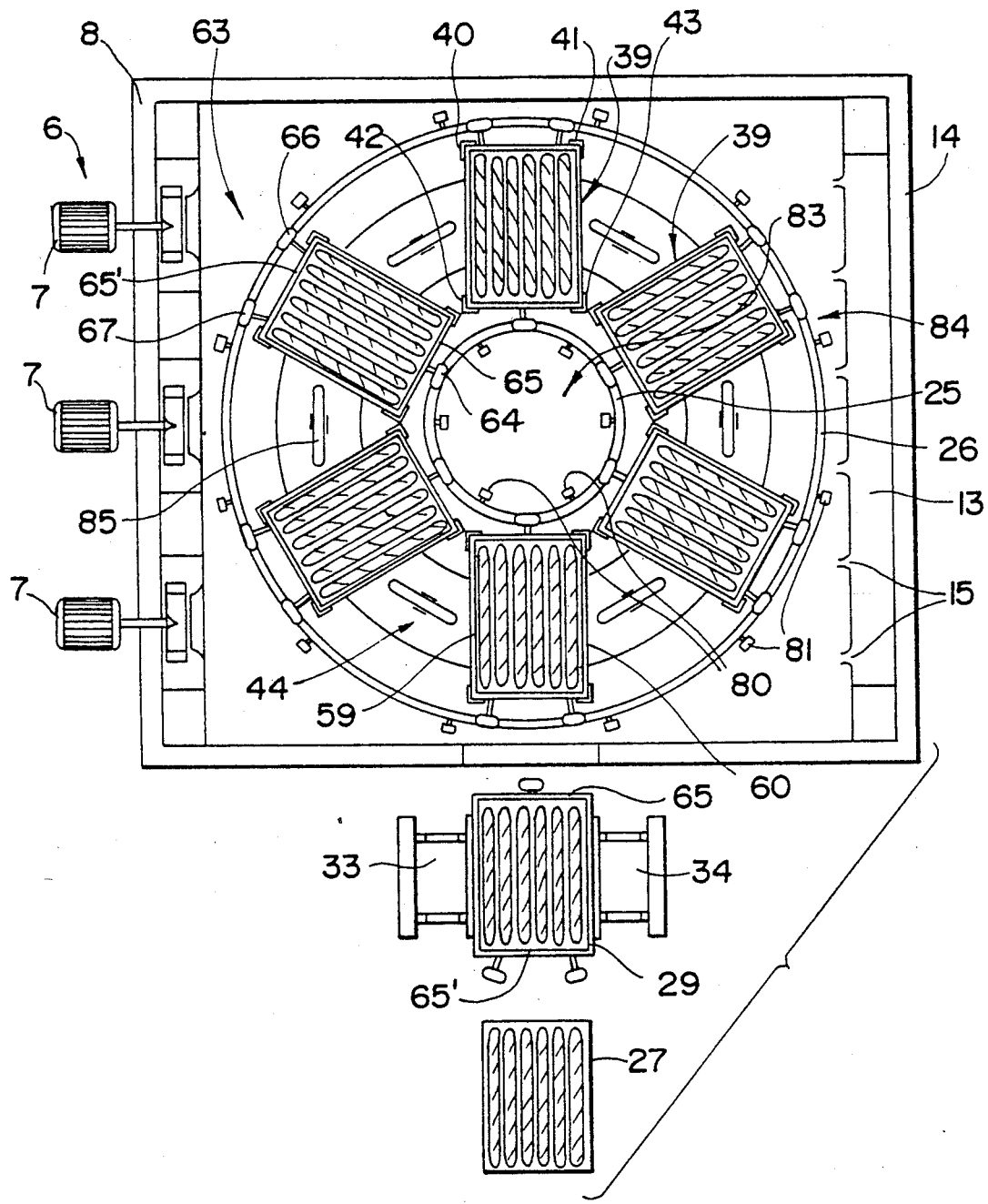

BAKERY OVEN WITH CONTINUOUS BAKING PROCESS

BACKGROUND OF THE INVENTION

1. Field of the Invention

The invention relates to a bakery oven with continuous baking process comprising a baking chamber provided with a charging opening and a discharging opening, and containing a spiral conveying device provided with a helicoidal path for conveying, during the baking process, the bakery, Viennese bread products or the like, arranged on plates, trays, racks or the like, from the charging opening to the discharging opening.

This invention relates to the field of the agro-food industry and, more particularly, to manufacturers of production material intended for bread, such as Viennese bread bakeries or the like.

2. Discussion of Background Material

There are already known bakery ovens with continuous baking process which are generally incorporated into complete production lines allowing a high production cycle.

Experience has established that the best baking consistency for the products is achieved by conferring to the plates, trays, racks or the like some degree of rotation about a vertical axis during their stay within a baking chamber through which flows a hot-air stream.

There are already known ovens with at least one rotating trolley. More particularly, the plates, trays, racks or the like, onto which are arranged the products to be baked, are superposed on the ladder cleats a trolley is fitted with. This trolley is then engaged into the baking chamber of the oven. Then, appropriate driving means ensure its rotation about a vertical axis, thus exposing the trolley, from every angle, to the action of the horizontal hot-air stream generated by blowing and heating means.

If, in these ovens equipped with a rotating trolley, the baking of the products arranged on a same plate is very uniform, baking consistency is not always perfectly achieved from one plate to another, because it is difficult to have the same heat at the top, in the center and at the bottom of the trolley, especially since the plates remain, during the complete baking process, at the same level on this trolley.

In fact, since these ovens with a rotating trolley operate with discontinuous loads of a stack of plates filling a trolley, they cannot easily be integrated into industrial production lines in which the plates, trays, racks or the like are continuously coming from a processing unit located upstream.

In order to try to cope with the above-mentioned disadvantages, there has been provided an oven integrating a spiral conveying device comprising a continuous conveyer in the form of a spiral belt provided with radial rods or a chain provided with radially extending arms.

In fact, these above-mentioned rods or arms form the bearing means for the plates, trays or the like through the baking chamber of the oven. However, such a configuration has a number of disadvantages. Because the trays, plates or the like do indeed rest on the spiral conveyer simply by gravity, they proceed with difficultly along curved paths, and are caused to move in an aleatory manner with respect to each other. Also, some of these trays, plates or the like meet each other during their conveying, and continually cause jammings on the spiral conveyer. This results in frequent interruptions of the, which require the intervention of an operator.

Moreover, it should be appreciated that the use of the above-described a continuous spiral conveyer has a high cost. Moreover, there are difficulties in causing the spiral conveyer to progress with small curvature radii with respect to its width and the spiral conveyer requires complex mechanisms to be driven, switched on and for its looping path between the top and the bottom of its helicoidal path. These are disadvantages that the present invention attempts to solve.

SUMMARY OF THE INVENTION

It is an object of the present invention to cope with all the abovementioned disadvantages by providing a bakery oven with continuous baking process integrating a spiral conveying device which does not require a continuous conveyer.

The present invention solves the problems associated with known bakery ovens by providing a bakery oven with continuous baking process comprising a baking chamber provided with a charging opening and a discharging opening, and containing a spiral conveying device provided with a helicoidal path for conveying, during the baking process, the bakery products, such as Viennese bread products and the like, arranged on plates, trays, racks or the like, from the charging opening to the discharging opening. The oven includes frames which ensure the individual picking-up of the plates, trays, racks or the like outside the baking chamber and which lead them through the bakery chamber by means of the spiral conveying device, with the spiral conveying device comprising means for individually conveying and guiding the frames along the helicoidal path.

The advantages achieved by the present invention are primarily due to the fact that each plate, tray, rack or the like is picked up from its arrival at the baking oven until its leaving, so that it will be perfectly held along its path through the baking chamber. Hence, any moving in an aleatory manner of the plates, trays, racks or the like inside the baking oven is avoided, thereby avoiding risks of jammings or other disadvantages which usually lead to stopping of the unit.

On the other hand, compared to the known spiral conveyers, the frames onto which are arranged the plates, trays, racks or the like are particularly easy to be handled, which allows to have recourse to a simplified looping circuit, thereby achieving a lower cost and a smaller size of the bakery oven.

BRIEF DESCRIPTION OF THE DRAWINGS

The invention is now explained in more detail with reference to the drawings which represent only one embodiment of the present invention.

FIG. 2 shows a schematic elevation and cross-sectional view of the oven as shown in FIG. 1 (the helicoidal path as well as the frames provided with the plates, trays or the like not being shown);

FIG. 3 shows a schematic and elevational view of the looping circuit of the frames, which circuits are located outside the bakery oven;

FIG. 4 shows a schematic bird's eye and cross-sectional view according to IV—IV of FIG. 2, the frames provided with their plates, trays or the like being shown.

DETAILED DESCRIPTION OF THE PREFERRED EMBODIMENTS

Figure 1:
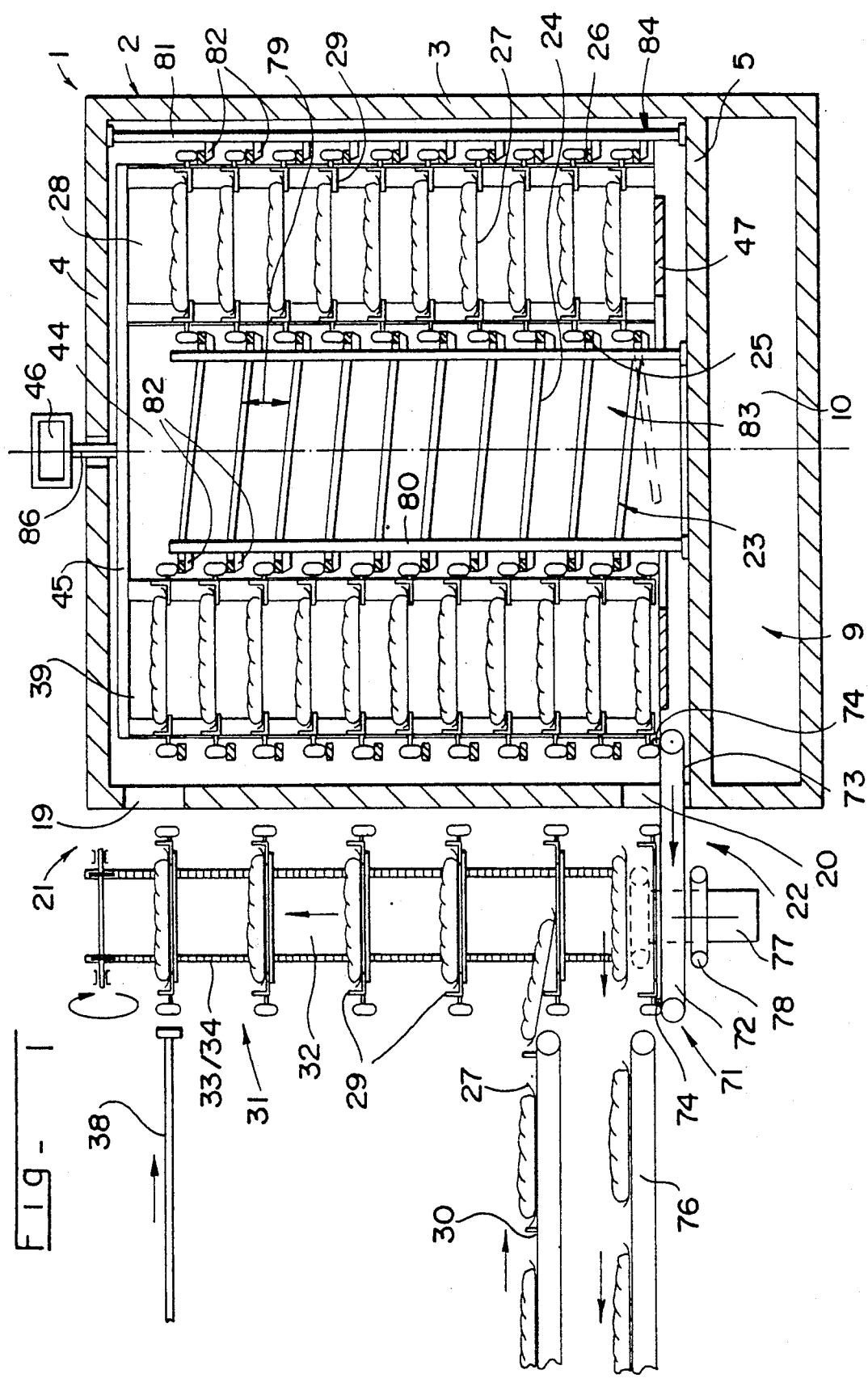
FIG. 1 shows a schematic elevation and cross-sectional view of a bakery oven according to the invention.

This invention relates to a bakery oven 1 intended for being integrated into a production line for bakery products, such as Viennese bread products or the like, to ensure their continuous baking.

Thus, bakery oven 1 comprises a baking chamber 2 defined by a vertical casing 3, as well as by an upper panel 4 and a lower panel 5 which close the vertical casing 3. A mechanical ventilation system 6, comprised of various fans 7, is arranged on one sidewall 8 of the baking chamber 2, such as to generate a hot-air stream crossing through the baking chamber 2.

Moreover, the bakery oven 1 comprises a recycling circuit 9 for the air cooled down during its passage through the baking chamber 2. This recycling circuit 9 is comprised of a box 10 arranged under the lower panel 5, and into one end of which a channel 11 conducts air, at the outlet of the fans 7, towards heating means 12. At another end, box 10 communicates with blowing boxes 13 arranged on the lateral side 14, opposite the ventilation system 6, of the baking chamber 2.

Preferably, the blowing boxes 13 comprise blowing apertures 15 oriented towards the fans 7, with the object of generating a nearly horizontal hot-air stream inside the baking chamber 2.

At inlet 16, in the box 10, of channel 11 coming from the fans 7 are arranged water spray nozzles 17 controlled, for instance, by an electro-valve 18. The object of there water spray nozzles is to moisten the atmosphere of the bakery oven 1 at the beginning of the baking process.

It should be appreciated that the recycling circuit 9 for the hot-air stream coming from the baking chamber 2 need not necessarily be arranged below the baking chamber, but may, for instance, be located at the periphery of the bakery oven 1.

The bakery oven also comprises a charging opening 19, as well as a discharging opening 20 through which are continuously engaged, and drawn out, the bakery products, Viennese bread products or the like.

Within the framework of the embodiment shown in the various Figures, these charging 19 and discharging openings 20 are located in the upper part 21 and the lower part 22 of the baking chamber 2, respectively, in a same vertical alignment.

It is however within the present invention that this arrangement of the openings 19, 20 may be changed or reversed without departing from the spirit of this invention.

It should be appreciated that in an industrial production unit for bakery products, such as Viennese bread products or the like, the products are generally arranged during the various steps, on plates, trays, racks or the like, facilitating their handling and storage.

Therefore, the object of this invention is to provide a bakery oven which is capable of ensuring the continuous baking of these bakery products, such as Viennese bread products or the like, by arranging the products on plates, trays, racks or the like.

In the following description, in order to make easier the understanding of same, "plates, trays, racks or the like" will be designated in a generic way by "plates".

Thus, according to the invention, the bakery oven 1 comprises, within its baking chamber 2, a spiral conveying device 23 capable of ensuring the transfer of the plates from the charging opening 19 of the baking chamber 2 to the discharging opening 20, and this over a time corresponding to the baking process of the bakery products, Viennese bread products or the like.

The spiral conveying device 23 comprises a helicoidal path 24 materialized by two rails 25, 26 arranged concentrically to each other and describing a spiral-shaped path.

According to one feature of the invention, the bakery oven 1 also comprises frames capable of ensuring the individual picking-up, outside the baking chamber 2, of each of the plates 27 to convey them along the helicoidal path 24, from the charging opening 19 to the discharging opening 20.

Furthermore, the spiral conveying device 23 comprises means 28 capable of individually holding and conveying each of the frames 29 during their moving along this helicoidal path 24.

In fact, this invention provides the implementation of means which allow to avoid any aleatory moving of the plates 27 inside the baking chamber 2, so as to avoid any obstruction of the baking chamber.

According to a preferred embodiment, the frames 29 are formed by frameworks capable of containing the plates 27. Hence, these frames 29 are comprised of an assembly of angle plates and sized slightly larger than the plates 27, in order to take into consideration the manufacturing tolerances of same and the distortions they are subject to ensure a prolonged use.

Thus, the plates 27, coming from a processing unit upstream and proceeding from a feed-in conveyer 30, are successively arranged in these frames 29 before being engaged into the baking chamber 2 through the charging opening 19.

It should be noted that the blowing apertures 15 start at the lower panel 5 of the baking chamber 2 and end at some distance from the upper panel 4, in order to have a relatively quiet blowing area in the upper part of the baking chamber 2. This is advantageous for the baking of Viennese bread products, wherein it is preferred not to blow hot air during the initial phase of the baking process, in order to allow the condensation of the atmospheric humidity onto the surface of the products.

In fact, this loading of the frames 29 occurs at their looping circuit 31 located between the discharging opening 20 and the charging opening 19. Since these latter are located in the same vertical alignment, the looping circuit 31 is formed by an elevator 32 comprised of two norias 33, 34 opposite to each other, and on which are horizontally arranged cleats 35, 36, 37 and 35', 36', 37', respectively, capable of bearing the frames 29. This elevator 32 is subjected to a sequential feed motion, so as to allow the successive loading of the plates 29, proceeding from the feed-in conveyer 30.

Preferably, this latter is located above the discharging opening 20, so as to allow the discharging from the baking chamber 2 of the frames 29 loaded with their plate 27 provided with the baked products. The problem related to the discharging of the plates from the bakery oven 1 will be dealt with further in the description.

Reverting to the initial phase of loading of the baking chamber 2, the plates 27, after having been engaged into the frames 29, vertically progress upwardly, so as to be successively located at the charging opening 19. Then, a pushrod 38 controls the engagement of the frame 29 into the baking chamber 2, so as to arrange same on the helicoidal path 24. Then, the means 28 of the spiral conveying device 23 ensure its holding and guiding along the helicoidal path 24.

In this respect, it should be specified that the holding and guiding means 28 are preferably composed of a set 39 of four vertical slides 40, 41, 42, 43 enclosing the frame 29 and plunging into the annular part defined by the rails 25, 26 forming the helicoidal path 24.

In fact, this set 39 of slides 40 thru 32 is an integral part of a roundabout 44 subjected to a sequential rotary motion comprising several identical sets 39 of slides. The number of these sets depends on the size of the frames 29, hence of the plates 27 to be conveyed, and, on the production capacity which the bakery oven 1 is to reach.

Thus, according to a preferred embodiment, the roundabout 44 consists of an upper tray 45 formed, for instance, of a wire netting, and is subjected to a rotary motion by driving means 46, and to this upper tray 45 are joined the upper ends of the slides 40 thru 43 of the various sets 39.

The slides 40 thru 43 are made integral, at their lower end, with an annular plate 47 conferring to the roundabout 44 a better rigidity. This annular plate 47, similar to the upper plate 45, is preferably made of a wire netting.

Thus, one understands that, by arranging the frames 29 between the slides 40 thru 43 of the various sets 39, it is possible to perfectly control their evolution along the rails 25, 26.

It should be appreciated that, since the slides 40 thru 43 are formed of angle plates enclosing the angles of the frames 29, some measures have to be taken to allow the engaging and disengaging of same from the silos which each of these sets 39 of slides 40 thru 43 forms. For this purpose, the slides 40, 41, arranged at the periphery of the roundabout 44, have, at their upper end 48 and lower end 49, notches 50, 51 allowing the passing through of the frames 29; namely, when same are located in front of the charging opening 19 and the discharging opening 20.

It should be appreciated, furthermore, that, because of the particular design of the helicoidal path 24 by means of two rails 25, 26 spaced apart from each other, the holding of the frames 29, namely at their engaging into the baking chamber 2 through the charging opening 19, should also be ensured, so that they do not fall into the annular space defined by the rails 25 and 26.

For this purpose, each of the sets 39 of the roundabout 44 comprises, at its upper part 52, means 53 capable of ensuring the transfer of the frames 29 from the charging opening 19 onto the rails 25, 26. Such means 53 are advantageously formed of two angle plates 54, 55 arranged at the upper ends of the slides 40, 42 and the slides 41, 43, respectively. These angle plates 54, 55 are subjected to a rotary motion about a horizontal axis 56, 57, so that, in active position, they have one of their wings 58 in a substantially horizontal plane and on which may rest one of the side edges 59, 60 of the frames 29 coming from the charging opening 19.

Once the frames 29 have been arranged in front of the rails 25, 26, an actuating lever 61, 62 causes the withdrawal of the angle plates 54, 55 by rotation about their horizontal axis 56, 57. The frame 29 thus rests on the rails 25, 26, while engaging between the slides 40 thru 43 of a set 39 of the roundabout 44.

The actuating levers 61, 62 can be actuated by any known operating means, so that, when a set of slides approaches the charging opening 19, the angle plates 54, 55 are brought into active position, and, when they move off this charging opening 19, the angle plates are brought back into their withdrawn position. In this respect, by way of example, a cam may be arranged on the lower face of the upper panel 4 corresponding to the baking chamber 2, with this cam actuating the actuating levers 61, 62 in the above-mentioned conditions.

Further to the above description, it will be understood that, by ensuring the sequential rotation of the roundabout 44, the frames 29 progress along the turns of the spiral described by the rails 25, 26 of the helicoidal path 24, while vertically moving inside the slides 40 thru 43 of each of the sets 39.

Preferably, the frames 29 are provided with rolling means 63 facilitating their progress along the rails 25, 26, finally allowing the use of low-power driving means. Such rolling means 63 advantageously consist of a perpendicularly inserted first roller 64 in the vertical median plane on the rear transversal edge 65 of the frame 29. Moreover, these rolling means 63 are completed by two radially inserted rollers 66, 67 in the proximity of the ends of the front transversal edge 65' of the frame 29.

Finally, after a determined number of rotation sequences depending on the number of turns of the spiral described by the helicoidal path 24, and on the number of silos the roundabout 44 comprises, the frames 29 arrive in front of the discharging opening 20 located at the bottom of the baking chamber 2. At that moment, they should be drawn out of the baking chamber.

In order not to hinder the discharging of the frames 29, the rails 25, 26 are interrupted in the vicinity of the discharging opening 20. The slides 40, 42 and 41, 43, respectively, are connected, at their lower end, by means of angle plates or similar 68, 69, so as to define a horizontal bearing plane onto which rests the frame 29 when leaving the rails 25, 26.

According to the invention, the bakery oven 1 is provided with means 71 capable of drawing out the frame 29 which is located in front of the discharging opening 20 at each stop of the roundabout 44, and placing them onto the cleats 35, 35' of the norias 33, 34 forming the elevator 32 which ensures the recycling of the frames 29.

Preferably, these means 71 consist of at least a chain conveyer 72 penetrating into the baking chamber 2 through the discharging opening 20 and comprising at least one chain 73 provided with dogs 74 capable of co-operating with at least one seizing organ the front transversal edge 65' of the frames 29.

Thus, under the action of the rotation of the chains 73, the dogs withdraw the frames 29, successively, from the baking chamber 2 to finally place them onto the cleats 35, 35' of the norias 33, 34 corresponding to the elevator 32.

The frame 29, thus drawn out of the baking chamber 2, is loaded with a plate 27 provided with baked bakery or Viennese bread products. The plate 27 should thus be taken off the frame 29 to be placed onto a feed-out conveyer 76, and finally allowing the recycling of the frame 29.

For this purpose, the bakery oven 1 comprises means 77 capable of taking the plate 27 off the frame 29 proceeding from the baking chamber 2 and placing same onto the feed-out conveyer 76.

According to a preferred embodiment, these means 77 consist of two small-size chain conveyers 78 which lift the plate 27 provided with the baked products passing through the framework formed by the frame 29. This plate 27 is thus slightly lifted above this latter, then, under the action of the rotation of the chains, transferred onto the feed-out conveyer 76.

As described above, the frames 29 provided with their plate 27 loaded with products to be baked rest on the rails 25, 26 of the helicoidal path 24, these rails 25, 26 being supported by means of posts 80, 81, respectively, provided with brackets 82 and arranged in the inner part 83 and on the periphery 84 of this helicoidal path 24. Therefore, the roundabout 44 is subjected only to the strains related to the control of the rotation of these frames 29 and not to their weight. Thus, it can be envisaged to hang this roundabout 44, by means of its upper plate 45, from the upper panel 4 of the baking chamber 2. However, it can also be foreseen to provide the lower annular plate 47 with rolling means 85 resting on the lower panel 5 of the baking chamber 2. This latter solution, while limiting the strains at the upper panel 4, facilitates the mounting of the bakery oven 1.

Within the framework of the embodiment shown in the various Figures, the centering of the roundabout 44 is achieved by the guiding of the driving shaft 86, co-operating with the driving means 46, through the upper panel 4, and by means of rollers 87 inserted under the lower annular plate 47, which rollers 87 co-operate with a circular guide 88 secured onto the lower panel 5 of the baking chamber 2.

Of course, other embodiments of this centering of the roundabout 44 within the baking chamber 2 can be envisaged without therefore departing from the framework and the spirit of this invention.

As specified hereabove, the only object of the roundabout 44 is to guide and push the frames 29 onto the rails 25, 26. However, since its rotation is of the sequential type, it has to overcome the inertia forces related to the load these frames 29 provided with their plate 27 loaded with products to be baked represent and this at each rotation sequence.

Therefore, it is preconized, according to the invention, to provide the bakery oven 1 with driving means 46 capable of conferring, at each rotation sequence, a progressive acceleration and slowing down to the roundabout 44.

In brief, the operation of the bakery oven with continuous baking process, which is the object of this invention, is as follows:

during the phase of standstill of the elevator 27, a plate 32 loaded with products to be baked and proceeding from a feed-in conveyer 30 is arranged onto an empty frame 29 located on the elevator 32;

the frame 29, provided with a plate 27 and located on the elevator 32 at the height of the charging opening 19, is engaged by means of the pushrod 38, into the baking chamber 2;

simultaneously, a frame 29 is taken off the baking chamber 2 through the discharging opening 20, then the plate 27 loaded with the baked products is removed from same, and placed onto the feed-out conveyer 76;

during the next step, the roundabout 44 starts a rotation by a determined angle, in order to bring the next silo, formed by a set 39 of slides 40 thru 43, in front of the charging opening 19 and discharging opening 20;

during this rotation of the roundabout 44, the angle plates 54, 55 on which rests the frame 29, which has been engaged into the baking chamber 2, withdraw, allowing this latter to rest on the rails 25, 26;

during this rotation sequence of the roundabout 44, the frame 29, when nearing the discharging opening 20, leaves the rails 25, 26, to be positioned onto the horizontal bearing plane 70 defined at the bottom of the slides 40 thru 43;

in addition, this rotation of the roundabout 44 is accompanied by the lifting, by one pitch, of the frames 29 arranged on the elevator 32, in order to bring an empty frame 29 in front of the feed-in conveyer 30 conveying plates 27 loaded with products to be baked, and to arrange a frame 29 loaded with such a plate in front of the charging opening 19; and then, the cycle starts again from the beginning.

The time of performance of such a cycle can be foreseen in an adjustable manner, so that the baking time can be adjusted depending on the nature of the products to be baked.

Moreover, the production capacity of such bakery ovens 1 can also be adjusted by modifying the number of turns of the spiral described by the helicoidal path 24, or the number of frames 29 distributed over such a turn. In this respect, it should be appreciated that the pitch 79 of a turn of the spiral depends on the height of the products to be baked.

Thus, this invention allows to cope with all the disadvantages usually met within the framework of the bakery ovens with continuous baking process.

More particularly, by having recourse to means for individually picking-up each of the trays, plates, racks or the like to ensure the transfer of same through the baking chamber containing a spiral conveying device, this invention allows to cope with the problem of the size of the bakery oven, while avoiding the use of a particularly expensive spiral conveyer on which the trays, plates, racks or the like move in an aleatory manner.

Moreover, by ensuring a rotation of the plates, trays, racks or the like about a vertical axis, this bakery oven allows to guarantee a perfect baking consistency of the products.

I claim:

1. Bakery oven for performing a continuous baking process, comprising:

a baking chamber, said baking chamber including a charging opening and a discharging opening;

a plurality of containers for holding products to be baked;

a spiral conveying device for individually conveying said plurality of containers along a helicoidal path from said charging opening to said discharging opening;

a plurality of frames insertable on and removable from said spiral conveying device each frame associated with an individual container for ensuring individual picking up of an individual container of said plurality of containers from outside said baking chamber by the associate frame;

means for inserting and removing individual frames of said plurality of frames from said spiral conveying device; and said spiral conveying device including means for individually conveying and guiding each of said plurality of frames with an associate container along the helicoidal path from said charging opening to said discharging opening.

2. The bakery oven according to claim 1, wherein each frame of said plurality of frames comprise an assembly of angle plates.

3. The bakery oven according to claim 2, wherein each frame of said plurality of frames is slightly larger than a corresponding container so as to be capable of holding the container.

4. The bakery oven according to claim 1, wherein said baking chamber includes an upper part containing said charging opening and a lower part containing said discharging opening; and said charging opening and said discharging opening are substantially vertically aligned.

5. The bakery oven according to claim 4, wherein said means for inserting and removing individual frames of said plurality of frames from said spiral conveying device comprise a looping circuit for the plurality of frames located outside of said baking chamber between said charging opening and said discharging opening.

6. The bakery oven according to claim 5, wherein said looping circuit comprises an elevator composed of two oppositely positioned norias containing horizontally arranged cleats capable of bearing frames of said plurality of frames from said discharging opening up to said charging opening for return to the baking chamber.

7. The bakery oven according to claim 6, further comprising a pushrod for pushing frames of said plurality of frames into said charging opening.

8. The bakery oven according to claim 6, wherein said means for individually conveying and guiding comprise a roundabout having sequential rotary motion, and said means for inserting and removing individual frames removes a frame arriving at said discharging opening at each stoppage of said roundabout, and places the frame onto said cleats.

9. The bakery oven according to claim 8, wherein said means for inserting and removing individual frames include at least one chain conveyor penetrating into said baking chamber through said discharging opening, and comprising at least one chain with dogs capable of cooperating with at least one seizing element on a front transversal edge of the frames to successively withdraw the frames from said baking chamber onto said cleats upon rotation of said at least one chain.

10. The bakery oven according to claim 9, further comprising means for removing a container from a corresponding frame, and placing the container onto a feed-out conveyer, said means for removing a container comprising two chain conveyers which lift the container to a height of said feed-out conveyer.

11. The bakery oven according to claim 1, wherein said spiral conveying device comprises two rails concentrically arranged with respect to each other, and forming a spiral-shaped path having an inner portion and a periphery portion.

12. The bakery oven according to claim 11, further including posts and brackets supporting said two rails, said posts and brackets being arranged at said inner portion and said periphery portion.

13. The bakery oven according to claim 1, wherein frames of said plurality of frames comprise a framework which is symmetrical to a vertical median plane, said framework has a rear transversal edge and a front transversal edge, and includes means for permitting rolling so as to facilitate progress of frames along said helicoidal path, said means for permitting rolling comprising a perpendicularly inserted first roller substantially aligned in the vertical median plane on said rear transversal edge, and two radially inserted rollers positioned on end portions of said front transversal edge.

14. The bakery oven according to claim 13, wherein said spiral conveying device comprises two rails concentrically arranged with respect to each other, and forming a spiral-shaped path having an inner portion and a periphery portion.

15. The bakery oven according to claim 1, further comprising a mechanical ventilation system arranged on a sidewall of said baking chamber, and a recycling circuit for air cooled down during passage through the mechanical ventilation system and blowing boxes arranged on a lateral side of said baking chamber opposite said mechanical ventilation system.

16. The bakery oven according to claim 15, wherein said blowing boxes comprise blowing apertures oriented towards said mechanical ventilation system for generating a substantially horizontal hot-air stream, with said blowing apertures starting at a lower panel of said baking chamber and ending at a distance from an upper panel of said baking chamber in order to achieve a relatively quiet blowing area in an upper portion of said baking chamber in which said charging opening is located.

17. The bakery oven according to claim 1, wherein said at least one container comprises a tray, a plate, or a rack.

18. The bakery oven according to claim 1, wherein said means for individually conveying and guiding said plurality of frames along a helicoidal path from said charging opening to said discharging opening comprises two rails concentrically arranged with respect to each other, and forming a spiral-shaped path having an inner portion and a periphery portion forming an annular portion; and said means for individually conveying and guiding said frames comprising a roundabout including means for effecting sequential rotary motion.

19. The bakery oven according to claim 18, wherein said roundabout comprises at least one set of four vertical slides composed of angle plates within said annular portion capable of enclosing at least one superposed frame along said helicoidal path.

20. The bakery oven according to claim 19, wherein two angle plates are arranged at the periphery portion, and include at upper and lower ends, notches permitting the passage of frames when located at said charging opening and said discharging opening.

21. The bakery oven according to claim 19, wherein said four vertical slides comprise a lower end having a horizontal bearing plane, said two rails being interrupted in the vicinity of said discharging opening allowing the frames, prior to being discharged from said baking chamber, to rest on the horizontal bearing plane.

22. The bakery oven according to claim 14, wherein each of said at least one set of four vertical slides comprises an upper part including means for ensuring transfer of frames from said charging opening onto said two rails.

23. The bakery oven according to claim 22, wherein said means for ensuring transfer of frames comprise two angle plates capable of rotary movement about a horizontal axis, and each including a wing arranged in a substantially horizontal plane when said angle plates are in an active position to receive a frame thereon; actuating levers capable of withdrawing said angles plates; and means for actuating said actuating levers.

24. The bakery oven of claim 23, wherein said means for actuating comprise a cam.

25. The bakery oven according to claim 19, wherein said roundabout includes an upper tray, an annular plate, and means for driving with sequential rotary motion; and said four vertical slides each comprise an upper end and a lower end, and each upper end being joined with said upper tray, and each lower end being joined with said annular plate.

26. The bakery oven according to claim 25, wherein at least one of said upper tray and said annular plate comprise a wire netting.

27. The bakery oven according to claim 25, wherein said annular plate includes means for rolling which rest on a lower panel of said baking chamber.

28. The bakery oven according to claim 25, wherein said roundabout is centered with respect to said baking chamber by a driving shaft inserted through an upper panel of said baking chamber, which driving shaft connects said upper tray to said means for driving, and by rollers under said annular plate cooperating with a circular guide secured onto a lower panel of said baking chamber.

29. The bakery oven according to claim 25, wherein said means for driving are capable of progressive acceleration and slowing down at each rotation sequence.

* * * * *